March 22, 1960     J. W. MECKENSTOCK     2,929,645
CONDUIT CONNECTION HAVING ALIGNMENT MEANS
Filed Aug. 17, 1956     2 Sheets-Sheet 2
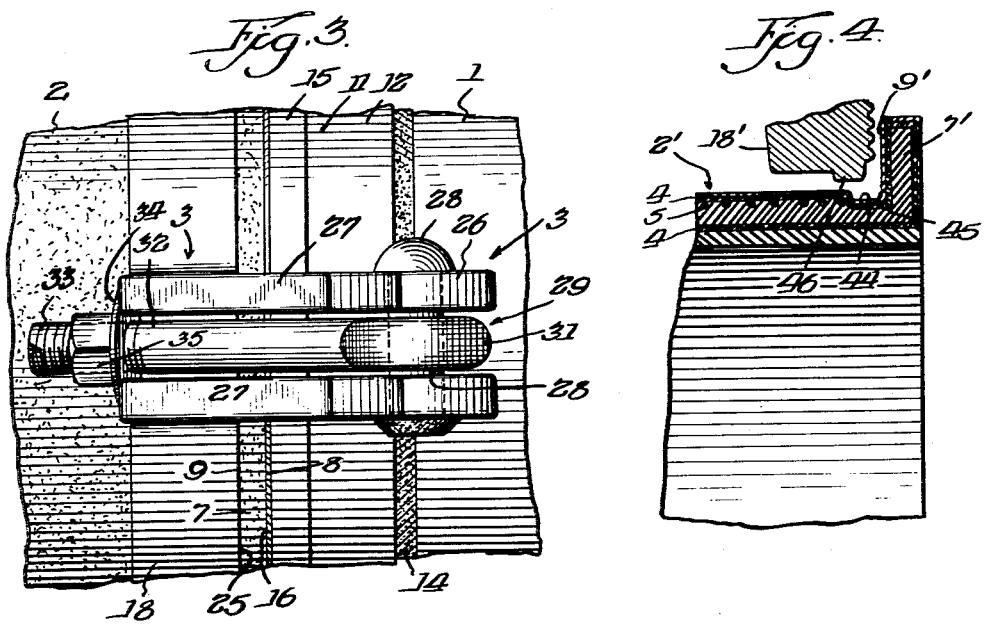
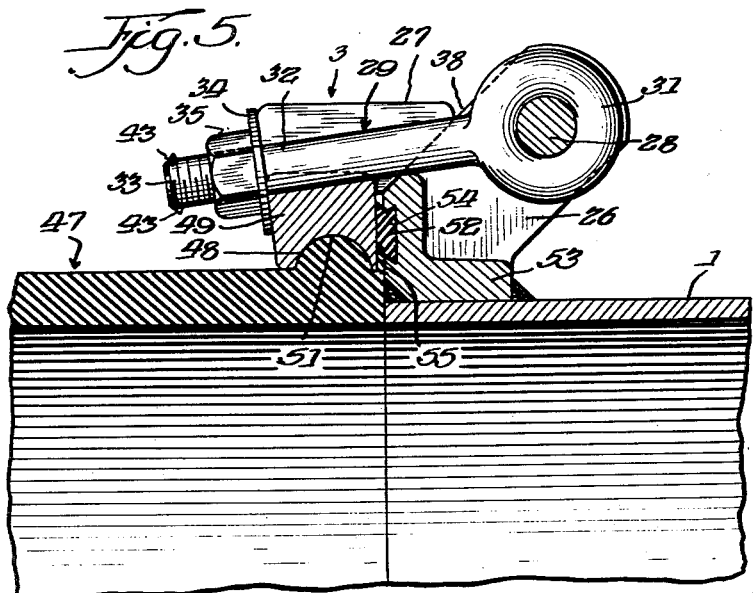
Inventor:
John W. Meckenstock.
By Stice & Stice Attys.

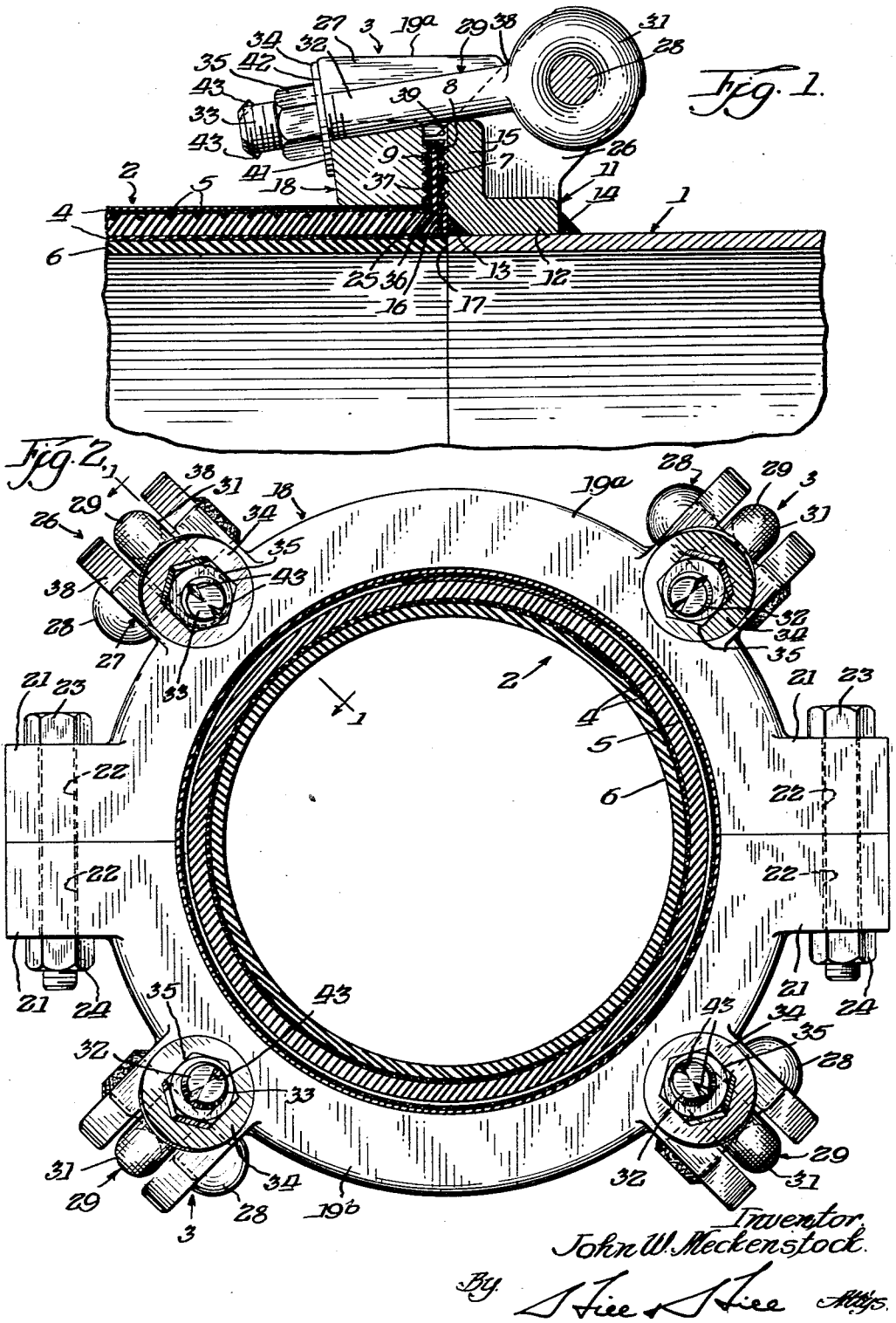

United States Patent Office 2,929,645
Patented Mar. 22, 1960

2,929,645

CONDUIT CONNECTION HAVING ALIGNMENT MEANS

John W. Meckenstock, Ottawa, Ill., assignor to Meckum Engineering, Inc., Chicago, Ill., a corporation of Illinois Application August 17, 1956, Serial No. 604,762

4 Claims. (Cl. 285—238)

The invention relates generally to fluid conduits, and more particularly to a connection for use with fluid conduits of the flexible type.

The invention has among its objects the production of a fluid conduit connection particularly adapted for use in joining a section of rigid conduit such as metal pipe or the like to a section of flexible conduit, which is relatively simple in construction, durable and efficient in use, and relatively inexpensive to manufacture.

Another object of the invention is the production of such a conduit connection which may be very quickly and easily disconnected or connected when desired, at the same time providing a positive connection, and which may be adapted for use with flexible conduit having various types of terminal structures.

A further object of the invention is the production of such a connection which is provided with means for self-alignment of the fluid conduits as the connection is locked in operative relation, insuring accurate alignment of the conduit sections with resultant long life and minimum wear thereon.

A further object of the invention is the production of a fluid conduit connection having the above advantages, which at the same time permits maximum bending of the flexible conduit per unit of length.

Many other objects and advantages of the construction herein shown and described will be obvious to those skilled in the art from the disclosure herein given.

In the drawings, wherein like reference characters indicate like or corresponding parts:

Fig. 1 is a sectional view through a connection constructed in accordance with the present invention, taken approximately on the line 1—1 of Fig. 2;

Fig. 2 is an end elevational view of a connection embodying the present invention as viewed from the flexible conduit side thereof;

Fig. 3 is a top plan view of the structure illustrated in Fig. 1, showing details of the locking mechanism;

Fig. 4 is a longitudinal sectional view of an end portion of a flexible conduit section illustrating the application of the invention to a modified form of terminal structure on the flexible conduit; and Fig. 5 is a sectional view similar to Fig. 1, illustrating the application of the present invention to a flexible conduit section of a different form.

Referring to the drawings and more particularly to Figs. 1, 2 and 3, the reference numeral 1 indicates generally a section of rigid conduit such as metal tubing or pipe, and the reference numeral 2 indicates a section of flexible conduit, the sections of conduit having their adjacent ends in abutting relation and adapted to be operatively secured together by a connecting structure indicated generally by the reference numeral 3. The flexible conduit 2 may be suitably constructed and may comprise one or more fabric reinforcing plies 4, suitable reinforcing means, as for example, a helical member of wire or the like having a plurality of convolutions or turns 5, the plies and reinforcing means being imbedded in a suitable semi-resilient material such as natural or synthetic rubber, or other flexible plastics or the like.

As illustrated in Fig. 1, the end portion of the flexible conduit 2 is provided with an outwardly directed integral flange 7 suitably formed from the plies and body of the conduit 2, and illustrated in the embodiment of Fig. 1 as having parallel faces 8 and 9, the face 8 forming the end face of the section 2. The rigid conduit section 1 may be provided with an annular shaped member or ring indicated by the numeral 11, illustrated in Fig. 1 as being generally angular or L-shaped in cross section, having a tubular portion 12 coaxially positioned with the conduit 1 and secured thereto by suitable means, as for example welding 13 and 14 extending peripherally around the conduit 1. The radially extending outwardly directed leg or flange 15 may be provided with a face 16, coextensive with the adjacent end 17 of the pipe 1 and cooperable therewith to form the end face of the section.

The two conduit sections 1 and 2 are adapted to be positioned in substantially axial alignment with their corresponding end faces 8 and 16 in abutting relation as illustrated in Fig. 1.

The connecting means 3 may comprise a ring 18 which is illustrated in Fig. 2 as split diametrically and each half 19a and 19b may be provided with a pair of lugs 21 adapted to abut the corresponding lugs 21 on the other half, the lugs being provided with aligned bores 22 therein for the reception of connecting bolts 23 which are cooperable with threaded nuts 24 to lock the two halves of the ring in assembled relationship. As will be apparent from a reference to Figs. 1 and 2, the ring 18 may have an inner diameter approximately the same as the outer diameter of the flexible conduit 2 and is provided with an end face 25 adapted to engage the face 9 of the flange 7, whereby the latter may be positioned between the end face 16 of the ring 11 and the face 25 of the ring 18. The ring 11 and ring 18 are provided with a plurality of bifurcated lugs indicated by the reference numerals 26 and 27, each pair of lugs 26 having a suitable member such as a rivet 28 extending between the lugs and carrying thereon an eye bolt 29, the rivet 28 extending through the eye 31 of the bolt 29. The pairs of lugs 26 are adapted to be aligned with the corresponding lugs 27 on the ring 18, the shank 32 of each bolt 29 extending between the lugs 27, the threaded free end 33 of each eye bolt having a washer 34 and nut 35 thereon, by means of which clamping forces may be exerted on the flange 7 as the nuts 35 are drawn up on their cooperable bolts 29. As illustrated in Fig. 1, the opposed faces 16 and 25 of the rings 11 and 18 may be provided with annular shaped ridges 36 and 37, which are illustrated as being semi-circular in cross section and extend around the faces of the ring members, with the ridges 37 being radially staggered with respect to the ridges 36, as illustrated in Fig. 1, if so desired, to provide a very durable and efficient seal between the cooperable elements.

The construction illustrated in Fig. 1 is also provided with means for automatically aligning the ends of the conduits to be coupled, such means comprising engageable inclined edge faces 38 and 39 on the lugs 26 and 27, respectively, which extend at a suitable angle with respect to the axes of the conduits, whereby lateral forces are applied to the rings in centering directions in the event the axes thereof are undesirably offset. The proportions of the lugs 26 and 27 and the relative positions of the edge faces 38 and 39 are so determined that adequate compression of the flange 7 is insured prior to the possible seating of all cooperable pairs of lugs on the respective members. Likewise, it will be noted that the end face 41 of the ring 18 and the corresponding end faces 42 of the projections or lugs 27, which end faces are a continuation of the corresponding face of the ring 18, are adapted to extend substantially normal to the axis of the associated eye bolt 29, whereby the washer 34 is provided with the maximum amount of bearing surface, and in like manner the angular relation will prevent possible disengagement of the eye bolts with the lugs 27.

The connection of a pair of conduit sections constructed in accordance with the present invention is a very simple matter and may be accomplished with a minimum amount of time and effort by bringing the sections into approximate alignment, with the ring 18 being positioned adjacent the end of the conduit 1 to enable the eye bolts 29 to be rotated into engaging position with the lugs 27, following which the nuts 35 may be tightened on the bolts 29, drawing the ring 18 and flange 7 of the flexible conduit into engagement with the flange 15 on the rigid conduit. In so assembling the conduits exact alignment of the conduit ends is not necessary, as once the eye bolts have been positioned the two rings will suitably center automatically as the nuts 35 are drawn down on their respective eye bolts as a result of the inclined surfaces 38 and 39 on the lugs 26 and 27.

If desired, the free ends of the eye bolts 29 may be suitably formed, as for example, by swaging or the like, to provide projections 43 which are operative to prevent removal of the nuts 35 and washers 34 from their eye bolts, the latter, however, having a threaded portion of sufficient length to permit the nuts to be disengaged from the ring 18 when they have been turned down to the free end thereof. Thus the entire assembly may comprise two structures, one the ring 18 and associated parts and two, the ring 11 and associated parts, so that danger of separation and loss of elements of the connecting means is eliminated.

Fig. 4 illustrates the application of the present invention to a slightly different form of flexible conduit, the construction generally being similar to that previously described, with the exception that the conduit is provided with an annular groove 44 adjacent the radial terminal flange 7′, the adjacent side wall 45 of the groove 44 forming an extension of the side wall 9′ of the flange 7′. In like manner the ring 18′ may be constructed similar to the ring 18 but provided with an inwardly directed flange 46 of a size to be operatively seated in the groove 44. When the halves of the ring 18′ are mounted on the conduit 2′, with the flange 46 positioned in the groove 44, the ring 18′ will be firmly locked on the end of the conduit, the groove 44 preventing axial movement of the ring relative to the conduit.

Fig. 5 illustrates the application of the invention to a modified form of flexible conduit, in which the flexible conduit 47 is provided with an annular rib 48 of generally semi-circular cross section, as clearly illustrated in Fig. 5. Similarly the ring 49, corresponding to the ring 18, may be provided with an annular shaped groove 51 which is generally complemental in cross section to the rib 48. To insure effective sealing between the ends of the conduit sections an annular ring-shaped gasket member 52 may be disposed between the ring 49 and the ring 53 corresponding to the ring 11, the gasket member 52 being seated in a dovetail shaped slot 54 in the ring 53, with the adjacent portion of the gasket 52 being complementally shaped to the groove 54, and the opposite portion of the gasket bearing on the ring 49.

If desired, the free end of the conduit 47 may be provided with an outwardly extending annular shaped flange 55 adapted to be positioned between the ring 49 and the portion of the ring 53 intermediate the groove 54 and the conduit side wall. In this construction the split ring 49 would be initially clamped in position at the rib 48, as illustrated in Fig. 5, and the gasket 52 would be carried in the groove 54 and form a part of the rigid conduit assembly. The remaining connecting structure and aligning means may be the same as that heretofore described, and upon engagement of the eye bolts 29 with the lugs 27 on the ring 49 and drawing of the nuts thereon, the gasket 52 will be compressed between the ring 49 and the ring 53, which together with the flange 55 will very effectively seal the joint between the two conduit sections. At the same time the inclined surfaces on the lugs 26 and 27 will operatively center and align the conduit ends.

It will be noted from the above description that I have provided a very efficient yet simple coupling for connecting two fluid conduits, particularly wherein one section is flexible and the other is rigid. Likewise I have provided a novel coupling structure which may be readily connected and disconnected when desired and wherein the connecting means may be readily constructed to be retained on one of the fittings, whereby possibility of loss of elements of the connecting means, such as nuts, washers and the like, is prevented.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a connection for joining a section of a semi-resilient conduit to a section of rigid conduit, the combination of a semi-resilient conduit, the end portion of which is provided with an outwardly extending annular shaped rib thereon, a diametrically split ring adapted to encircle the conduit at said rib, means for drawing the sections of said ring toward one another for clamping the ring on said conduit, a second conduit of rigid material having a cooperable ring mounted thereon, said conduits being adapted to be arranged with their end portions in engagement and said rings in cooperable relation, said rings being provided with pairs of cooperable lugs thereon having substantially flat complemental engageable faces inclined with respect to the conduit axes operative to laterally draw the conduit ends into operative axial alignment as the rings are brought together, eyebolts pivotally supported between respective pairs of lugs on one of said rings with their threaded stem portions disposed between respective pairs of lugs on the other of said rings, and nuts threaded on the free ends of said eyebolts and operatively abutting the end faces of the lugs between which the respective stem portions extend, such end faces diverging outwardly with respect to the plane of the conduit sections and the stems being pitched toward the conduit axis from the pivoted ends of the eyeballs.

2. A connection as defined in claim 1 wherein said rib is provided with a cross sectional arcuate outer surface and said split ring is provided with a cooperable complementally shaped groove therein.

3. A connection as defined in claim 1, wherein said rib is in the form of a flange of rectangular cross-section, a radially extending face of which forms the end face of the conduit, said flange being adapted to be positioned and compressed between said rings to form a seal for the juncture of said conduits.

4. A connection as defined in claim 3 wherein said flanged conduit is provided with a peripheral annular groove adjacent said flange and said split ring is provided with radially extending inwardly directed means adapted to extend into said groove.

References Cited in the file of this patent

UNITED STATES PATENTS

| | | |
|---|---|---|
| 7,221 | Loring | July 11, 1876 |
| 296,093 | Wells | Apr. 1, 1884 |
| 1,839,338 | Pentz | Jan. 5, 1932 |
| 1,840,483 | Brown et al. | Jan. 12, 1932 |

(Other references on following page)

UNITED STATES PATENTS

| | | |
|---|---|---|
| 1,901,420 | Sternman | Mar. 14, 1933 |
| 1,986,419 | Taylor | Jan. 1, 1935 |
| 1,992,503 | Penick et al. | Feb. 26, 1935 |
| 2,134,314 | O'Donnell | Oct. 25, 1938 |
| 2,146,218 | Kimmich et al. | Feb. 7, 1939 |
| 2,220,785 | Goodall | Nov. 5, 1940 |
| 2,342,192 | Grigsby | Feb. 22, 1944 |
| 2,459,250 | Stillwagon | Jan. 18, 1949 |
| 2,517,391 | Ernestus | Aug. 1, 1950 |

FOREIGN PATENTS

| | | |
|---|---|---|
| 4,892 | Great Britain | Feb. 27, 1911 |
| 428,667 | Germany | May 8, 1926 |
| 142,259 | Australia | July 16, 1951 |